United States Patent
Wang et al.

(10) Patent No.: US 7,522,565 B2
(45) Date of Patent: Apr. 21, 2009

(54) SIGNALING TRANSPORT OVER A BEARER NETWORK FOR LOW LATENCY SERVICES

(75) Inventors: Jin Wang, Lisle, IL (US); Subhasis Laha, Aurora, IL (US); Jiansong Wang, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 867 days.

(21) Appl. No.: 10/687,319

(22) Filed: Oct. 16, 2003

(65) Prior Publication Data

US 2005/0085234 A1     Apr. 21, 2005

(51) Int. Cl.
*H04J 3/12*   (2006.01)
*H04W 4/00*   (2006.01)

(52) U.S. Cl. ...................... 370/338; 370/528

(58) Field of Classification Search .......... 370/352, 370/410, 469, 468, 522, 236, 524, 528, 338
See application file for complete search history.

(56) References Cited

U.S. PATENT DOCUMENTS

| | | | | |
|---|---|---|---|---|
| 5,717,830 | A * | 2/1998 | Sigler et al. | 455/426.1 |
| 5,983,099 | A * | 11/1999 | Yao et al. | 455/426.1 |
| 6,477,370 | B1 * | 11/2002 | Sigler et al. | 455/427 |
| 6,701,151 | B2 * | 3/2004 | Diachina et al. | 455/452.1 |
| 6,850,497 | B1 * | 2/2005 | Sigler et al. | 370/310 |
| 6,934,525 | B1 * | 8/2005 | Dunlop et al. | 455/403 |
| 7,020,098 | B2 * | 3/2006 | Ehrsam et al. | 370/260 |
| 7,289,822 | B2 * | 10/2007 | Rosen et al. | 455/518 |
| 2002/0118665 | A1 * | 8/2002 | Cleveland et al. | 370/342 |
| 2002/0145990 | A1 * | 10/2002 | Sayeedi | 370/335 |
| 2002/0173326 | A1 * | 11/2002 | Rosen et al. | 455/518 |

FOREIGN PATENT DOCUMENTS

| | | |
|---|---|---|
| EP | 1 463 346 A1 | 9/2004 |
| WO | WO 2004/098092 A1 | 11/2004 |

OTHER PUBLICATIONS

Agilent Technologies: "Designing and Testing CDMA2000 Mobile Stations" Application Note 1358, Online! Dec. 17, 2001, pp. 1-32, XP002316696 USA.

* cited by examiner

*Primary Examiner*—Seema S Rao
*Assistant Examiner*—Mon Cheri S Davenport (57) ABSTRACT

A wireless communication network is disclosed comprising a base station system, a switching system, and a transport network. The transport network comprises a conventional signaling network configured to transport call signaling and a bearer network configured to transport user communications. The bearer network also transports call signaling, as special connections are established and a portion of the capacity of the special connections are reserved for transporting call signaling. In response to receiving call signaling from a mobile wireless device or a packet data network, the base station system or the switching system determines if the call signaling is for a low latency service. If the call signaling is for a low latency service, then the base station system or the switching system forwards the call signaling over the special connection. If not, then the base station system or the switching system transmits the call signaling over the conventional signaling network.

20 Claims, 6 Drawing Sheets

SIGNALING TRANSPORT OVER A BEARER NETWORK FOR LOW LATENCY SERVICES

BACKGROUND OF THE INVENTION

1. Field of the Invention

The invention is related to the field of communications, and in particular, to transporting signaling over a bearer network for low latency services provided by a wireless communication network.

2. Statement of the Problem

Communication providers are continually improving the services they provide to their customers. Wireless services have become very popular due to the conveniences that they provide to the customers. Wireless services, such as cellular and PCS phones, are common for both personal and business use. Because many communication providers provide the basic cellular or PCS service, these communication providers compete to provide other services that are new and useful.

One service provided by one or more communication providers is Push to Talk (PTT) service. PTT service was initiated by Nextel Communications of Reston, Va. PTT-type services will be referred to herein as Push to Call (PTC) services. Push to Call is a service that allows a subscriber to use their cellular phone like a walkie-talkie. The subscriber simply pushes a button on the phone to quickly connect to one or more other subscribers set up in their group list or "buddy list" maintained in a Push to Call (PTC) server. Some subscribers like the quick connection provided by the PTC service.

One challenge in providing PTC service is that low latency call setup is desired. End-to-end call setup should be about one second or less to provide the walkie-talkie operation that is satisfactory to the subscriber. Low latency call setup may also be desired for other services. Unfortunately, some current wireless communication networks may not be able to provide call setup that is fast enough for services that require low latency call setup.

Wireless communication networks typically include a signaling network and a bearer network. One reason why current wireless communication networks may not be able to provide fast enough call setup is that the signaling network for transporting call setup messages is engineered for capacity and not to provide low latency call setup. The signaling network is engineered to handle as many calls as possible because wireless communication networks provide service to millions of subscribers. One way the signaling network increases capacity is with message bundling. For message bundling, the signaling network buffers multiple signaling messages to a destination before transmitting the messages to the destination. Message bundling can allow the signaling network to handle higher call loads, but may also increase call setup delays. The call setup delays may not be as important in the signaling network because the signaling network transports signaling messages that are generally not real-time critical. The signaling messages may be delayed without a noticeable effect as long as the delay is not exorbitant. Call setup latency for a typical call may be multiple seconds.

Unfortunately, many wireless communication networks are not currently configured to provide low latency call setup. Because the call setup latency of the wireless communication networks may be too high to provide low latency services, the communication providers may not be able to offer valuable low latency services, such as PTC services, to their customers and potential customers.

SUMMARY OF THE SOLUTION

The invention solves the above problems and other problems with a wireless communication network and methods of operating a wireless communication network in exemplary embodiments described herein. The wireless communication network embodying the invention is able to provide low latency service by transporting call signaling for the low latency service over a bearer network.

The wireless communication network is comprised of a base station system, a switching system, and a transport network that connects the base station system and the switching system. The transport network comprises a signaling network and a bearer network. The signaling network is configured to transport call signaling and the bearer network is configured to transport bearer traffic.

The bearer network is comprised of a plurality of connections. A special connection is established between the switching system and the base station system over the bearer network. With the special connection established, at least a portion of the capacity of the special connection is reserved for transporting call signaling. The size of the reserved capacity of the special connection may be dynamic depending on the needs of the wireless communication network.

In response to receiving call signaling from a mobile wireless device, such as a cell phone, the base station system determines if the call signaling is for a low latency service. One example of a low latency service is Push to Call service. If the call signaling is for a low latency service, then the base station system forwards the call signaling over the special connection on the bearer network. If the call signaling is not for a low latency service, then the base station system forwards the call signaling over the traditional signaling network. In response to receiving the call signaling over the special connection or the signaling network, the switching system forwards the call signaling over a packet data network.

In another embodiment, the switching system may receive call signaling from the packet data network. As in the previous embodiment, the special connection on the bearer network is established and a portion of the capacity of the special connection is reserved for transporting call signaling. Responsive to receiving the call signaling, the switching system determines if the call signaling is for a low latency service. If the call signaling is for a low latency service, then the switching system forwards the call signaling over the special connection on the bearer network. If the call signaling is not for a low latency service, then the switching system forwards the call signaling over the signaling network.

Advantageously, the wireless communication network described above is able to provide low latency call setup using the special connection on the bearer network for transporting call signaling. The special connection on the bearer network and the signaling network comprise parallel signaling networks. Using both the special connection and the signaling network to carry call signaling, the wireless communication network may optimize call setup latency without sacrificing capacity. The low call setup latency produced by the special connection may allow the wireless communication network to provide low latency services.

The invention may include other exemplary embodiments described below.

DESCRIPTION OF THE DRAWINGS

The same reference number represents the same element on all drawings.

DETAILED DESCRIPTION OF THE INVENTION

Figure 1A:
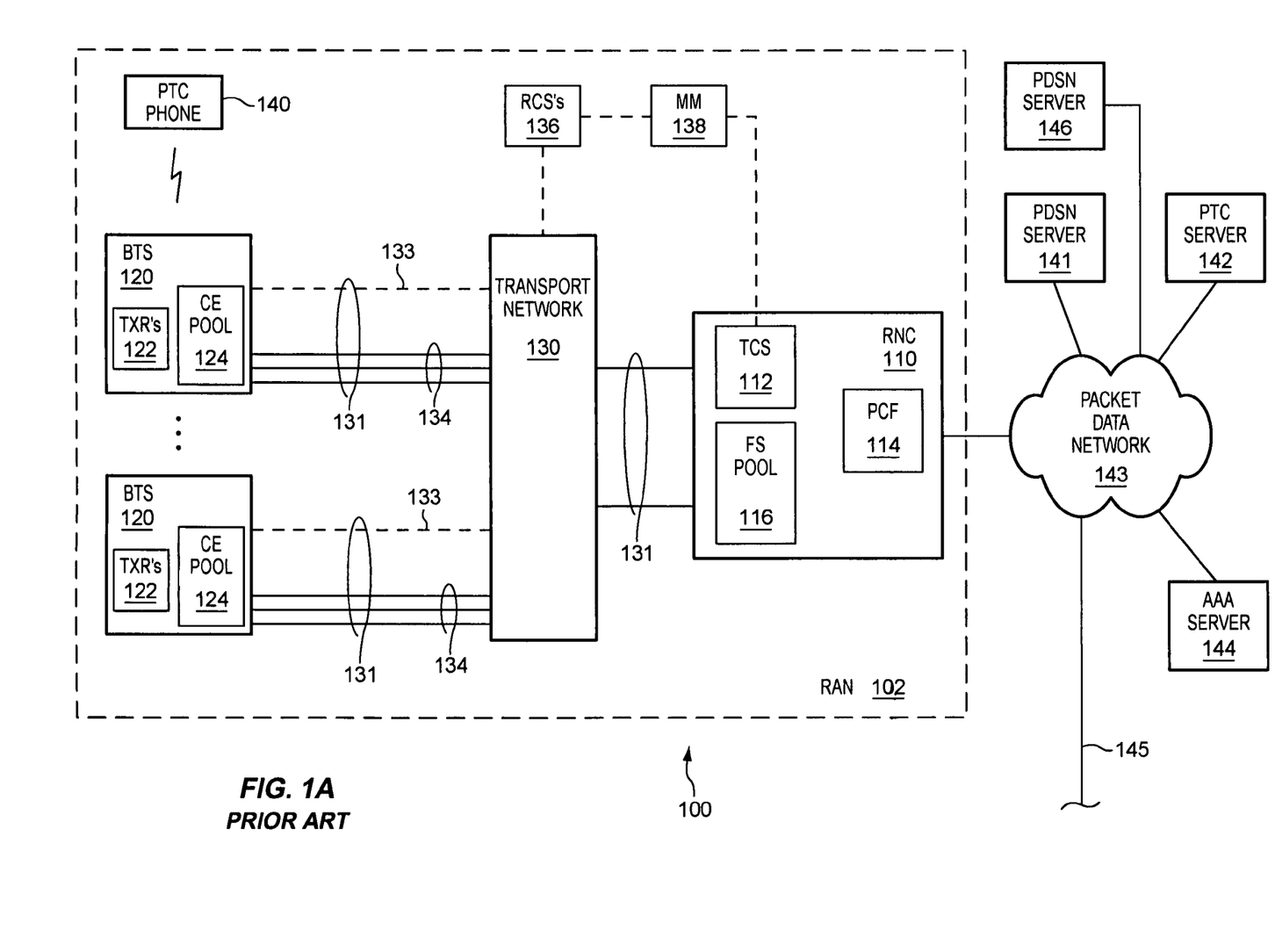
FIGS. 1A and 1B illustrate a prior art communication network to help better understand the invention.
Figure 1B:
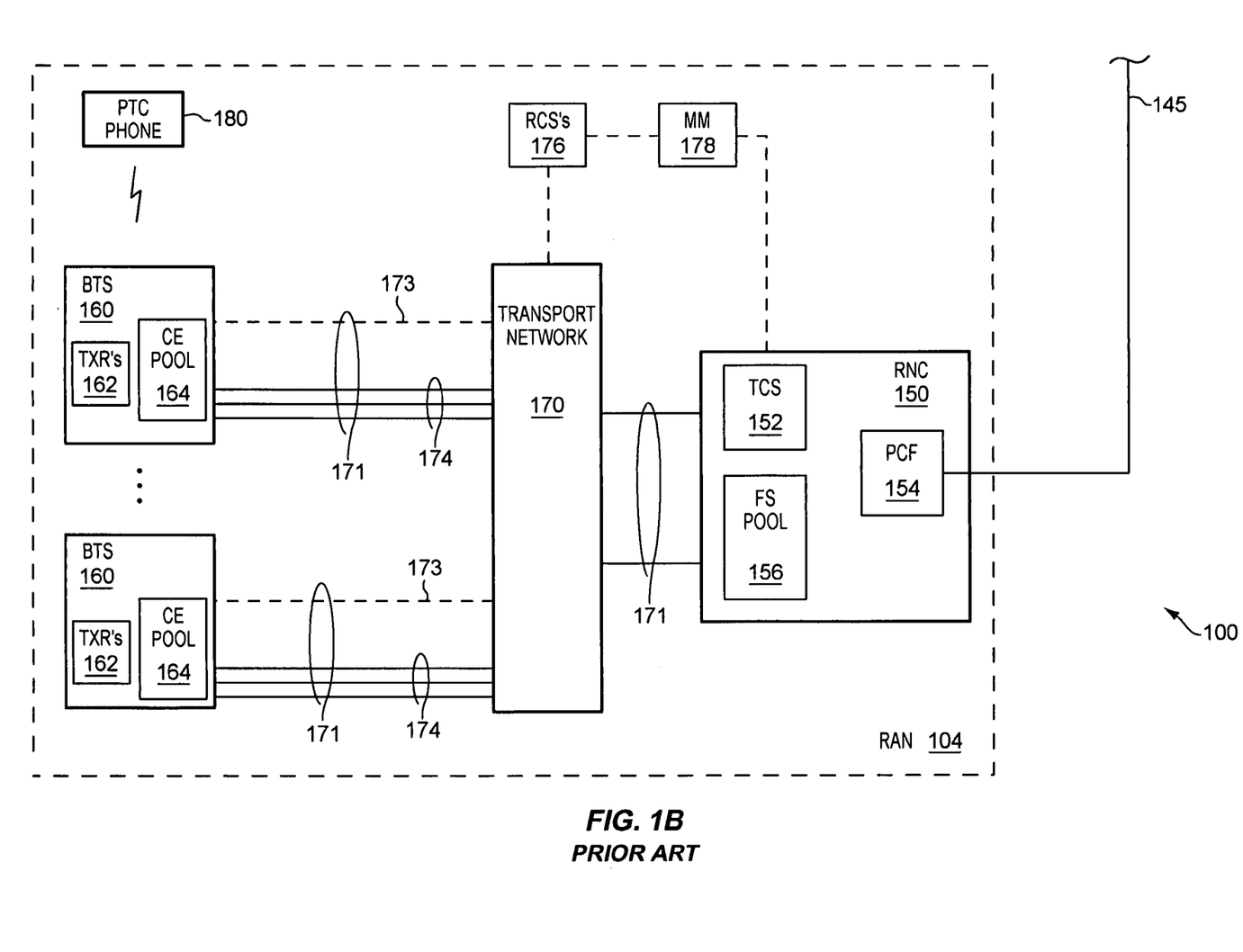

Prior Art Communication Network—FIGS. 1A and 1B

FIGS. 1A and 1B illustrate a prior art communication network 100 to help better understand the invention. In FIG. 1A, communication network 100 includes a Radio Access Network (RAN) 102, a packet data network 143, a Packet Data Serving Node (PDSN) server 141, a PDSN server 146, a Push To Call (PTC) server 142, and an Authentication, Authorization, and Accounting (AAA) server 144. RAN 102, PDSN server 141, PDSN server 146, PTC server 142, and AAA server 144 all connect to packet data network 143. In FIG. 1B, communication network 100 also includes RAN 104 that connects to packet data network 143 (see connection 145 in FIG. 1A). Communication network 100 is a third generation mobile system (3G) that provides voice and data services.

In FIG. 1A, RAN 102 performs radio functionality in communication network 100. RAN 102 includes a Radio Network Controller (RNC) 110 and Base Transceiver Stations (BTS) 120 connected by a transport network 130. Transport network 130 comprises a plurality of connections 131 between RNC 110 and BTS's 120. Transport network 130 includes a signaling network 133 and a bearer network 134. Signaling network 133 is represented in FIG. 1A as dashed lines. Bearer network 134 is represented in FIG. 1A as solid lines.

BTS's 120 terminate the radio communications with wireless devices, such as PTC phone 140. BTS's 120 each include a plurality of transceivers (TXR's) 122 and a Channel Element (CE) pool 124. Transceivers 122 include antennas (not shown) that transmit and receive signals over leased radio frequencies. Transceivers 122 create a "cell" within which phones are able to communicate with transceivers 122. Channel element pool 124 represents a plurality of channel elements in each BTS 120. A channel element is a logical element that represents resources in a BTS 120 that perform processes to handle calls.

BTS's 120 communicate with Radio Control Servers (RCS's) 136, Mobility Manager (MM) 138, and RNC 110 over signaling network 133 to exchange signaling. There is generally one RCS 136 for each BTS 120 in RAN 102. BTS's 120 communicate with RNC 110 over bearer network 134 to exchange bearer traffic.

RNC 110 acts as a switch between BTS's 120 and packet data network 143 to transport packet voice and data. RNC 110 includes a Traffic Control Server (TCS) 112, a Packet Control Function (PCF) 114, and a Frame Selector (FS) pool 116. TCS 112 manages resources in RNC 110, such as allocating and de-allocating frame selectors in FS pool 116, and manages call setup and call tear-down. PCF 114 interfaces RNC 110 with packet data network 143. FS pool 116 represents a pool of frame selectors in RNC 110. A frame selector is a logical element that represents resources in an RNC 110 that perform processes to handle calls.

In FIG. 1B, RAN 104 also performs radio functionality in communication network 100. RAN 104 includes a Radio Network Controller (RNC) 150 and Base Transceiver Stations (BTS) 160 connected by a transport network 170. Transport network 170 comprises a plurality of connections 171 between RNC 150 and BTS's 160. Transport network 170 includes a signaling network 173 and a bearer network 174. Signaling network 173 is represented in FIG. 1B as dashed lines. Bearer network 174 is represented in FIG. 1B as solid lines.

BTS's 160 terminate the radio communications with wireless devices, such as PTC phone 180. BTS's 160 each include a plurality of transceivers (TXR's) 162 and a Channel Element (CE) pool 164. Transceivers 162 include antennas (not shown) that transmit and receive signals over leased radio frequencies. Transceivers 162 create a "cell" within which phones are able to communicate with transceivers 162. CE pool 164 represents a plurality of channel elements in each BTS 160.

BTS's 160 communicate with Radio Control Servers (RCS's) 176, Mobility Manager (MM) 178, and RNC 150 over signaling network 173 to exchange signaling. There is generally one RCS 176 for each BTS 160 in RAN 104. BTS's 160 communicate with RNC 150 over bearer network 174 to exchange bearer traffic.

RNC 150 acts as a switch between BTS's 160 and packet data network 143 to transport packet voice and data. RNC 150 includes a Traffic Control Server (TCS) 152, a Packet Control Function (PCF) 154, and a Frame Selector (FS) pool 156. TCS 152 manages resources in RNC 150, such as allocating and de-allocating frame selectors in FS pool 156, and manages call setup and call tear-down. PCF 154 interfaces RNC 150 with packet data network 143. FS pool 156 represents a pool of frame selectors in RNC 150.

PTC phone 140 is a 3G phone that provides voice, data, and Push to Call (PTC) services. To be available for Push to Call (PTC) services, PTC phone 140 has to register with PTC server 142. Upon power up, PTC phone 140 generates a registration request and transmits the registration request over radio frequencies. One of transceivers 122 in BTS 120 receives the registration request from PTC phone 140. The receiving BTS 120 then transmits the registration request over signaling network 133. RNC 110 receives the registration request through RCS 136 and MM 138 over signaling network 133.

Within RNC 110, PCF 114 receives the registration request. Responsive to the registration request, PCF 114 contacts PDSN server 141 to select a PDSN from a pool of PDSN's. The selected PDSN establishes and maintains a Point to Point Protocol (PPP) session between PTC phone 140 and PDSN server 141. With the PPP session established, PCF 114 forwards the registration request to PTC server 142. To facilitate future communications, RNC 110 establishes a record that includes an identity of PTC phone 140 and an address for the selected PDSN.

Upon receiving the registration request, PTC server 142 records the identity of PDSN server 141 that is servicing PTC phone 140. As a default, PTC phone 140 is assigned a home RAN or a home MSC that most often services calls for PTC phone 140. Because PTC phone 140 is mobile, PTC phone 140 may "roam" out of the area serviced by the home RAN. When PTC phone 140 is roaming, PTC server 142 generates a record of the location of PTC phone 140, generally by recording the identity of PDSN server 141 currently servicing PTC phone 140. PTC server 142 also includes the identity of PTC phone 140, a "buddy list" set up for PTC phone 140, etc. PTC server 142 acts much like a Home Location Register (HLR) to track the location of PTC phone 140.

In FIG. 1B, PTC phone 180 is also a 3G phone that has to register with PTC server 142. Upon power up, PTC phone 180 generates a registration request and transmits the registration request over radio frequencies. One of transceivers 162 in BTS 160 receives the registration request from PTC phone 180. The receiving BTS 160 then transmits the registration request over signaling network 173. RNC 150 receives the registration request through RCS 176 and MM 178 over signaling network 173.

Within RNC 150, PCF 154 receives the registration request. Responsive to the registration request, PCF 154 contacts PDSN server 146 to select a PDSN from a pool of PDSN's. The selected PDSN establishes and maintains a Point to Point Protocol (PPP) session between PTC phone 180 and PDSN server 146. With the PPP session established, PCF 154 forwards the registration request to PTC server 142. To facilitate future communications, RNC 150 establishes a record that includes an identity of PTC phone 180 and an address for the selected PDSN.

Upon receiving the registration request, PTC server 142 records the identity of PDSN server 146 that is servicing PTC phone 180. When PTC phone 180 is roaming, PTC server 142 records the location of PTC phone 180, generally by recording the identity of the PDSN server 146 currently servicing PTC phone 180.

With both PTC phones 140 and 180 registered with PTC server 142, PTC phone 140 may make a PTC-type call. To initiate the call, the user of PTC phone 140 presses the Push to Call button on PTC phone 140. PTC phone 140 generates a PTC request and transmits the PTC request over radio frequencies. The PTC request may be to one or more recipients. One of transceivers 122 in BTS 120 receives the PTC request from PTC phone 140. The receiving BTS 120 then transmits the PTC request over signaling network 133. RNC 110 receives the PTC request through RCS 136 and MM 138 over signaling network 133.

Responsive to the PTC request from PTC phone 140, RNC 110 looks up the record established for PTC phone 140. The record indicates the address of the PDSN used to establish a prior PPP session with PDSN server 141 (referred to as the originating PDSN). PCF 114 forwards the PTC request to PTC server 142 through PDSN server 141.

Responsive to the PTC request, PTC server 142 determines recipients for the PTC call. PTC server 142 may look up records on the recipients for the call. PTC server 142 may look to buddy lists or group lists previously established for PTC phone 140. The recipient in this case is PTC phone 180.

Because PTC phone 180 has established a PPP session with PDSN server 146, PTC server 142 has a record that includes the address of the PDSN used to establish the prior PPP session (referred to as the terminating PDSN or PDSN server 146), an identity of PTC phone 180, etc. Based on the record, PTC server 142 forwards the PTC request to PCF 154 of RNC 150 through PDSN server 146.

RNC 150 may not know which BTS 160 is servicing PTC phone 180. Therefore, MM 138 generates a paging request to have the BTS's 160 "page" the PTC phone 180. RNC 150 transmits the paging request to all BTS's 160 over the signaling network 173. Responsive to the paging request, each BTS 160 broadcasts a page over a paging channel.

If PTC phone 180 receives the page, then PTC phone 180 transmits a response over radio frequencies. One of transceivers 162 in BTS 160 receives the response from PTC phone 180. The receiving BTS 160 then transmits the response over signaling network 173. RNC 150 receives the response through RCS 176 and MM 178 over signaling network 173.

Within RNC 150, PCF 154 forwards the response to PTC server 142 using PDSN server 146. PTC server 142 receives the response and forwards the response to PCF 114 of RNC 110 using PDSN server 141. RNC 110 forwards the response to BTS 120 over signaling network 133 through MM 138 and RCS 136. RNC 110 may have to transmit a paging request to all BTS's 120 to locate the BTS 120 serving PTC phone 140.

Responsive to the receiving the response, BTS 120 transmits the response to PTC phone 140 over radio frequencies. PTC phone 140 receives the response, which indicates that the PTC call is set up.

During the set up of the PTC call, connections are established and resources are allocated to handle the call. To establish connections, RCS 136 sets up a connection between RNC 110 and BTS 120 over bearer network 134. The connection over bearer network 134 is for transporting bearer traffic for the PTC call. Similarly, RCS 176 sets up a connection between RNC 150 and BTS 160 over bearer network 174. The connection over bearer network 174 is also for transporting bearer traffic for the PTC call.

To allocate resources, RCS 136 selects a Channel Element (CE) from CE pool 124 to handle the PTC call. TCS 112 selects a Frame Selector (FS) from FS pool 116 to handle the call. The selected frame selector and the selected channel element correspond to one another for at least the duration of the PTC call.

With the call set up, the user begins speaking into PTC phone 140. The microphone in the PTC phone 140 generates an analog voice signal representing the user's voice. PTC phone 140 then digitizes the analog voice signal and inserts the digitized voice into frames. PTC phone 140 encodes the digitized voice based on Code Division Multiple Access (CDMA) protocol and transmits the digitized voice frames over radio frequencies.

One of the transceivers 122 in BTS 120, and any other BTS within range of phone 140, receives the digitized voice frames. The receiving transceiver 122 sends the digitized voice frames to the channel element designated to handle the call. The channel element performs any other processing of the digitized voice frames. The channel element transports the digitized voice frames over the selected connection in bearer network 134 to the corresponding frame selector in FS pool 116 in RNC 110 designated to handle the call. The frame selector may further encode the digitized voice frames and forward the digitized voice frames to PCF 114. PCF 114 forwards the digitized voice frames to PTC server 142 through PDSN server 141. PTC server 142 forwards the digitized voice frames to PCF 154 through PDSN server 146.

PCF 154 forwards the digitized voice frames to the frame selector in FS pool 156 designated to handle the call. The frame selector forwards the digitized voice frames over the selected connection in bearer network 174 to the corresponding channel element in CE pool 164. The channel element performs any other processing of the digitized voice frames. The channel element forwards the digitized voice frames to one of transceivers 162. The transceiver 162 transmits the digitized voice frames over radio frequencies.

PTC phone 180 receives the digitized voice frames. PTC phone 180 decodes the digitized voice frames based on Code Division Multiple Access (CDMA) protocol. PTC phone 180 then converts the digitized voice into analog voice signals and applies the analog voice signals to a speaker. The speaker in PTC phone 180 then emits audible sounds to the user.

Unfortunately, RAN 102 and RAN 104 are not effectively engineered to handle low latency services, as low latency services require faster call setup (e.g., one second or less). Call setup time in RAN 102 and RAN 104 may be at least multiple seconds. The higher latency in RAN 102 and RAN 104 may be because BTS's 120 and BTS's 160 transmit call signaling, such as PTC requests and responses, over signaling networks 133 and 173. A main priority for signaling networks 133 and 173 is capacity, and signaling networks 133 and 173 are engineered to handle as many calls as possible because there are millions of subscribers. Because the high call setup latency of RAN 102 and RAN 104, RAN 102 and RAN 104 may not adequately provide low latency services, such as Push to Call services.

Figure 2:
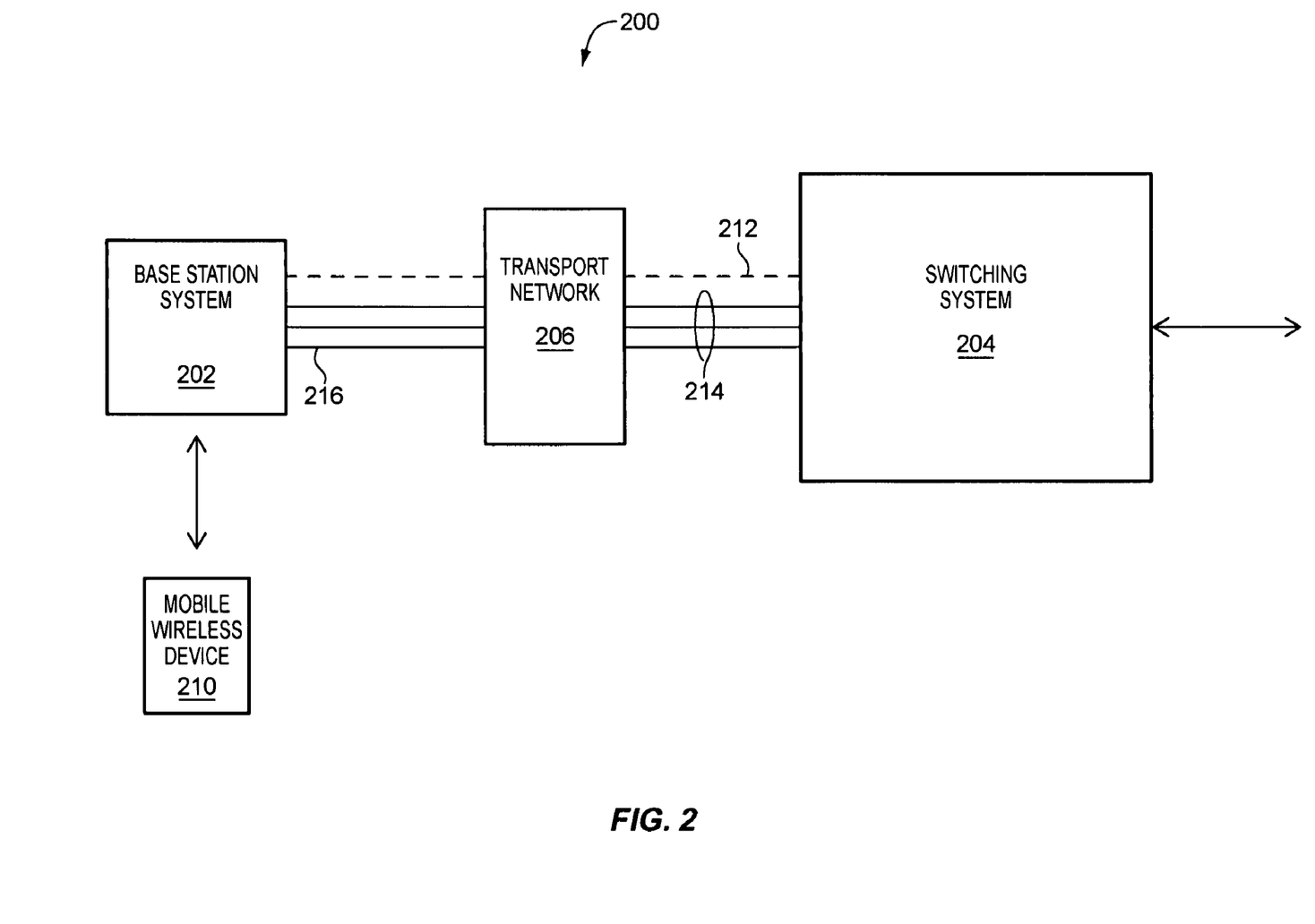
FIG. 2 illustrates a wireless communication network in an exemplary embodiment of the invention.
Figure 3:
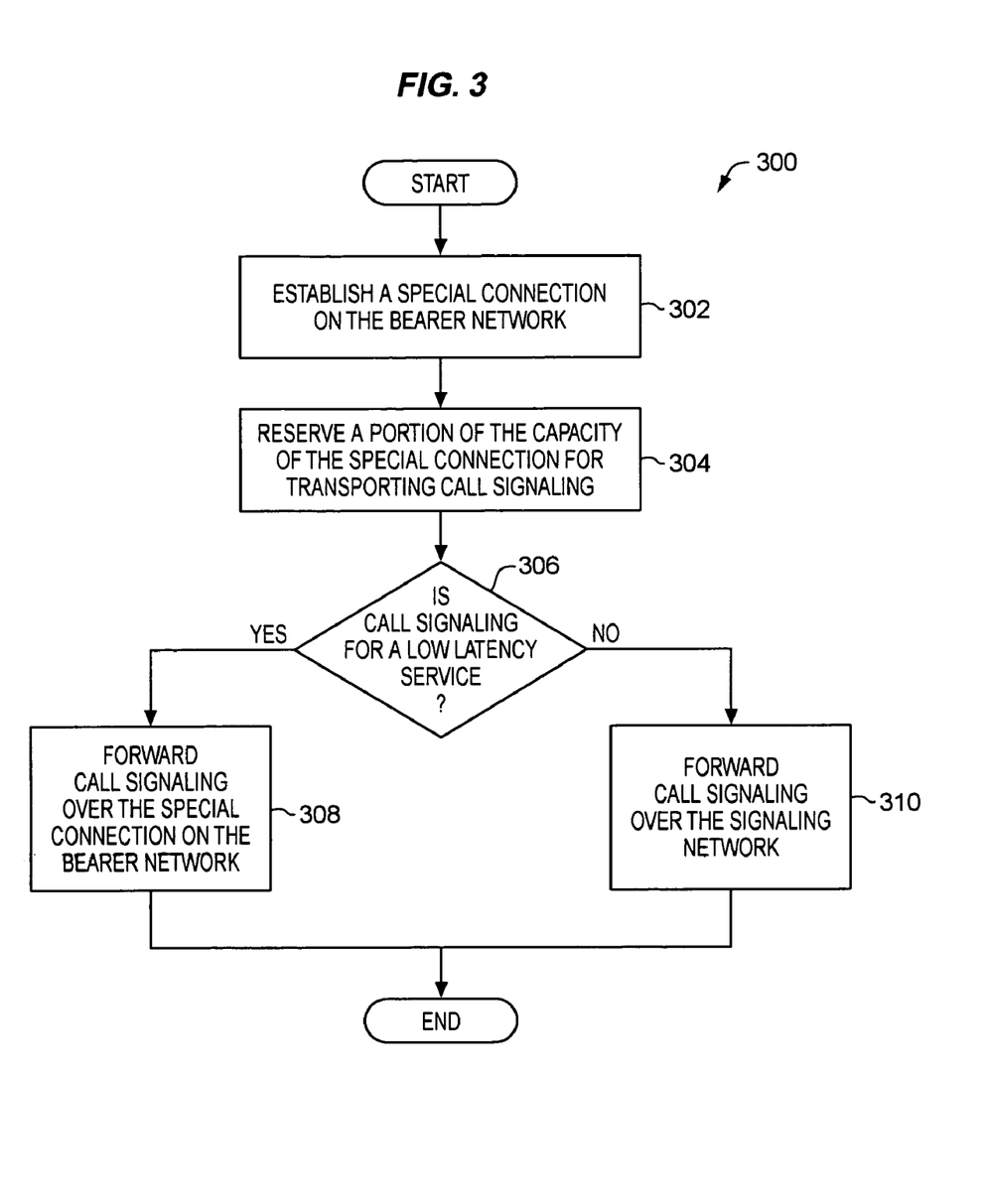
FIG. 3 illustrates a process for a wireless communication network where a bearer network transports call signaling in addition to a signaling network in an exemplary embodiment of the invention.

Wireless Communication Network Configuration and Operation—FIGS. 2-3

FIGS. 2-3 and the following description depict a specific exemplary embodiment of the invention to teach those skilled in the art how to make and use the best mode of the invention. For the purpose of teaching inventive principles, some conventional aspects of the invention have been simplified or omitted. Those skilled in the art will appreciate variations from this embodiment that fall within the scope of the invention. Those skilled in the art will appreciate that the features described below can be combined in various ways to form multiple variations of the invention. As a result, the invention is not limited to the specific embodiment described below, but only by the claims and their equivalents.

FIG. 2 illustrates a wireless communication network 200 in an exemplary embodiment of the invention. Wireless communication network 200 may comprise a Radio Access Network (RAN) in some embodiments. Wireless communication network 200 comprises a base station system 202, a switching system 204, and a transport network 206 configured to connect base station system 202 and switching system 204. Wireless communication network 200 may include other components, devices, or systems not shown in FIG. 2.

Base station system 202 is configured to communicate with switching system 204 and a mobile wireless device 210. One example of a base station system 202 includes a Base Transceiver Station (BTS). Mobile wireless device 210 comprises any hand-held device, or otherwise portable device, configured to communicate via wireless signals. Mobile wireless device 210 may comprise a cell phone, a PCS phone, a computer, a Personal Digital Assistant (PDA), or another mobile wireless device. Base station system 202 may communicate with mobile wireless device 210 using CDMA, TDMA, GSM, UMTS, 802.11b, 802.11g, or other wireless protocol. In a GSM or UMTS network, base station system 202 may comprise Node-B's whose function is similar to that of a BTS.

Switching system 204 is configured to communicate with base station system 202 and a packet data network (not shown). Switching system 204 comprises any system or device configured to switch communications between base station systems and the packet data network. An example of switching system 204 includes a Radio Network Controller (RNC). In a GSM network, switching system 204 may comprise a Base Station Controller (BSC).

Transport network 206 connects base station system 202 and switching system 204. Transport network 206 includes a signaling network 212 and a bearer network 214. Signaling network 212 is configured to transport call signaling and is illustrated as dashed lines in FIG. 2. Call signaling comprises any messages or signals used to facilitate call processing, such as call setup and call tear-down messages, a Push to Call request, or another message.

Bearer network 214 is comprised of one or more connections between switching system 204 and base station system 202. Bearer network 214 is configured to transport bearer traffic and is illustrated as solid lines in FIG. 2. Bearer traffic comprises voice and/or data transmitted in the call between a calling party and a called party or transmitted between a mobile client and server in the packet data network. In this embodiment, bearer network 214 is also configured to transport call signaling.

FIG. 3 illustrates a process 300 for wireless communication network 200 where bearer network 214 transports call signaling in addition to signaling network 212 in an exemplary embodiment of the invention. To transport call signaling, a special connection 216 on bearer network 214 is established in step 302. Switching system 204, base station system 202, or another system may establish special connection 216. Special connection 216 may be established using traditional methods or means. Multiple special connections may be established. In step 304, at least a portion of the capacity of special connection 216 is reserved for transporting call signaling. The size of the portion of the capacity of the special connection 216 may be dynamic depending on the needs of wireless communication network 200.

Responsive to receiving call signaling from mobile wireless device 210, base station system 202 determines if the call signaling is for a low latency service in step 306. A low latency service comprises any communication service for a wireless communications network requiring a faster call setup time, such as one second or less, than traditional services. An example of a low latency service includes Push to Call service. If the call signaling is for a low latency service, then base station system 202 forwards the call signaling over special connection 216 of bearer network 214 in step 308. If the call signaling is not for a low latency service, then base station system 202 forwards the call signaling over signaling network 212 in step 310. In response to receiving the call signaling over special connection 216 or signaling network 212, switching system 204 forwards the call signaling over the packet data network.

Advantageously, wireless communication network 200 is able to provide low latency call setup by using bearer network 214 for transporting call signaling. Generally, a bearer network transports real-time critical bearer traffic, such as voice calls. The real-time critical bearer traffic is more intolerable to delays and jitter. For instance, delays in the transport of voice frames for a call on bearer network 214 may be noticeable to the listener. The delays may cause part of a conversation to be lost. Because delays can have a detrimental effect, a bearer network is engineered to minimize latency and jitter. Therefore, bearer network 214 is more focused on low latency in comparison with signaling network 212 that is more focused on capacity. Because bearer network 214 is set up for low latency transmission, bearer network 214 can provide the low latency call setup required by real-time critical services, such as Push to Call service.

Special connection 216 on bearer network 214 and signaling network 212 comprise parallel signaling networks. Using both special connection 216 and signaling network 212 to carry call signaling, wireless communication network 200 may optimize call setup latency without sacrificing capacity.

Special connection 216 may transport bearer traffic in addition to call signaling. To control latency on the special connection 216, a control system (not shown) may control the amount of bearer traffic allowed on special connection 216.

In another embodiment, switching system 204 is the recipient of call signaling from the packet data network (not shown). As in the previous embodiment, the special connection 216 on bearer network 214 is established in step 302 and a portion of the capacity of special connection 216 is reserved for transporting call signaling in step 304. Responsive to receiving the call signaling over the packet data network, switching system 204 determines if the call signaling is for a low latency service in step 306. If the call signaling is for a low latency service, then switching system 204 forwards the call signaling over special connection 216 of bearer network 214 in step 308. If the call signaling is not for a low latency service, then switching system 204 forwards the call signaling over signaling network 212 in step 310.

Figure 4A:
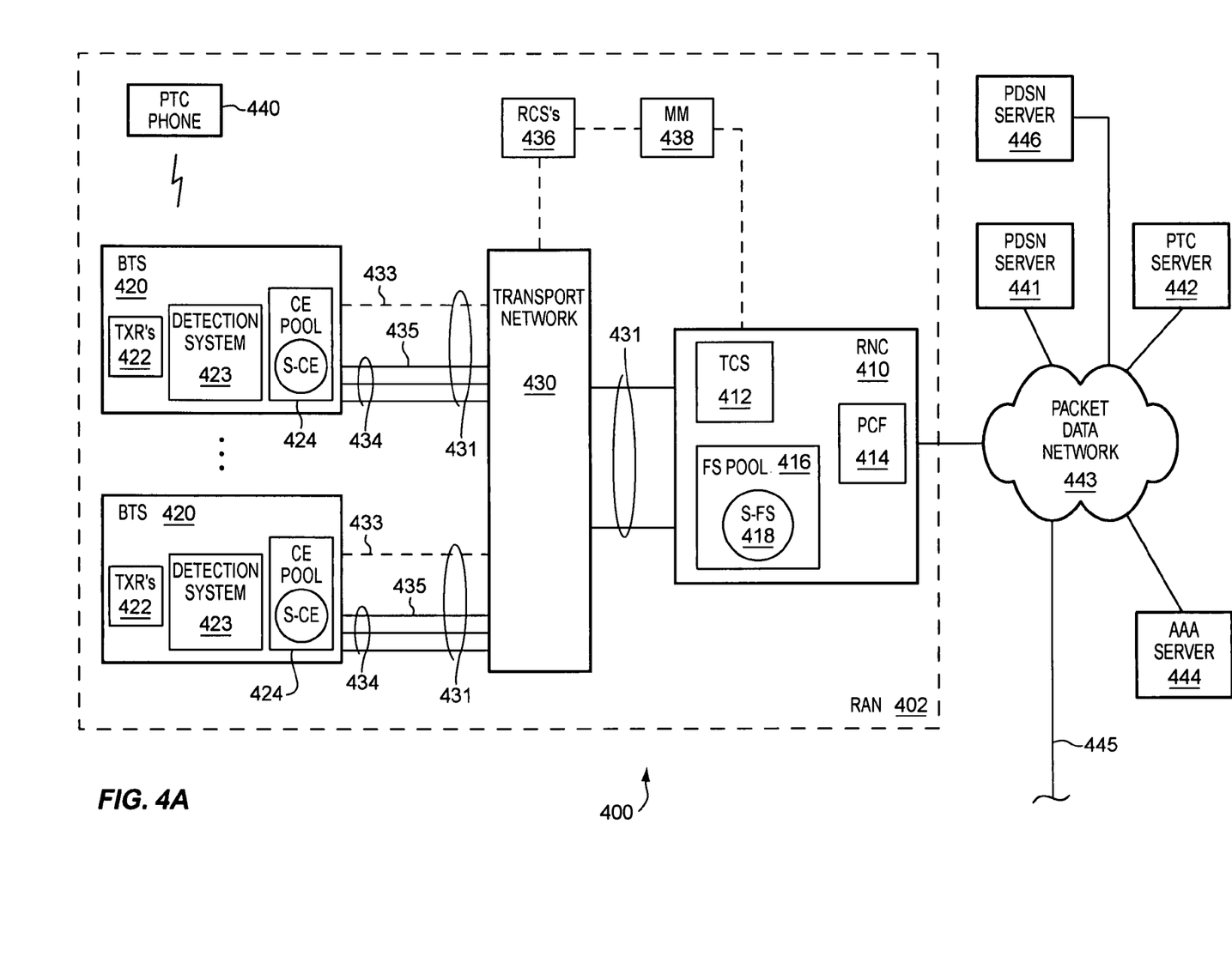
FIGS. 4A and 4B illustrate a communication network in an exemplary embodiment of the invention.
Figure 4B:
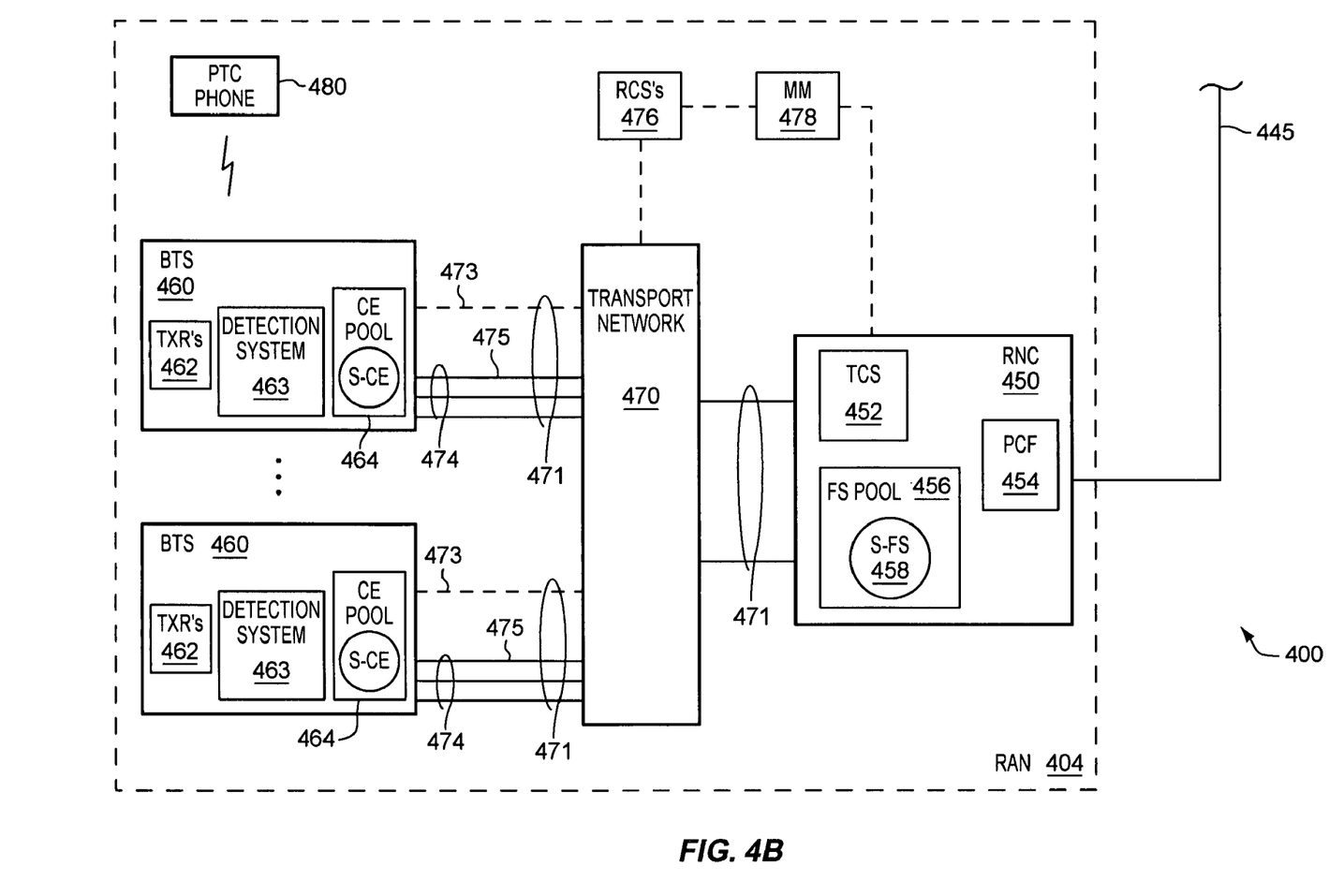

Communication Network Configuration and Operation—FIGS. 4A and 4B

FIGS. 4A and 4B illustrate a communication network 400 in an exemplary embodiment of the invention. In FIG. 4A, communication network 400 includes a Radio Access Network (RAN) 402, a packet data network 443, a Packet Data Serving Node (PDSN) server 441, PDSN server 446, a Push to Call (PTC) server 442, and an Authentication, Authorization, and Accounting (AAA) server 444. RAN 402, PDSN server 441, PDSN server 446, PTC server 442, and AAA server 444 all connect to packet data network 443. In a GSM or UMTS network, a Serving GPRS Service Node (SGSN) and a Gateway GPRS Service Node (GGSN) may be used instead of PDSN server 441 and PCF 414. Packet data network 443 may be an Internet Protocol (IP) network, an Asynchronous Transfer Mode (ATM) network, or a combination of the two. In FIG. 4B, communication network 400 also includes RAN 404 that connects to packet data network 443 (see connection 445 in FIGS. 4A and 4B). Communication network 400 is a third generation mobile system (3G) CDMA network that provides voice and data services. In other embodiments, communication network 400 may be a GSM, TDMA, or UMTS network.

In FIG. 4A, RAN 402 performs radio functionality in communication network 400. RAN 402 includes a Radio Network Controller (RNC) 410 and Base Transceiver Stations (BTS) 420 connected by a transport network 430. In a GSM or UMTS network, RNC 410 may be a Base Station Controller (BSC). Transport network 430 comprises a plurality of connections 431 between RNC 410 and BTS's 420. Transport network 430 includes a signaling network 433 and a bearer network 434. Signaling network 433 is represented in FIG. 4A as dashed lines. Bearer network 434 is represented in FIG. 4A as solid lines.

BTS's 420 terminate the radio communications with wireless devices, such as PTC phone 440. BTS's 420 each include a plurality of transceivers (TXR's) 422, a detection system 423, and a Channel Element (CE) pool 424. Transceivers 422 include antennas (not shown) that transmit and receive signals over leased radio frequencies. Transceivers 422 create a "cell" within which cellular phones, PCS phones, or other wireless devices are able to communicate with transceivers 422. CE pool 424 represents a plurality of channel elements in each BTS 420. A channel element is a logical element that represents resources in a BTS 420 that perform processes to handle calls.

BTS's 420 communicate with Radio Control Servers (RCS's) 436, Mobility Manager (MM) 438, and RNC 410 over signaling network 433 to exchange signaling. There is generally one RCS 436 for each BTS 420 in RAN 402. BTS's 420 communicate with RNC 410 over bearer network 434 to exchange bearer traffic. In a GSM or UMTS network, RCS 436 may also be referred to as a Radio Resource Controller (RRC).

RNC 410 acts as a switch between BTS's 420 and packet data network 443 to transport packet voice and data. RNC 410 includes a Traffic Control Server (TCS) 412, a Packet Control Function (PCF) 414, and a Frame Selector (FS) pool 416. RNC 410 may also communicate with other BTS's (not shown), other RNC's (not shown), and a Mobile Switching Center (MSC) (not shown). TCS 412 manages resources in RNC 410. For instance, RNC 410 may include twenty processors working in combination. TCS 412 may manage the workload handled by each processor. TCS 412 allocates and de-allocates frame selectors in FS pool 416 and manages call setup and call tear-down. PCF 414 interfaces RNC 410 with packet data network 443 through PDSN server 441. FS pool 416 represents a pool of frame selectors in RNC 410. A frame selector is a logical element that represents resources in an RNC 410 that perform processes to handle calls. In a GSM or UMTS network, a frame selector may be referred to as a data channel and FS pool 416 may be referred to as a data channel pool.

In FIG. 4B, RAN 404 also performs radio functionality in communication network 400. RAN 404 includes a Radio Network Controller (RNC) 450 and Base Transceiver Stations (BTS) 460 connected by a transport network 470. Transport network 470 comprises a plurality of connections 471 between RNC 450 and BTS's 460. Transport network 470 includes a signaling network 473 and a bearer network 474. Signaling network 473 is represented in FIG. 4B as dashed lines. Bearer network 474 is represented in FIG. 4B as solid lines.

BTS's 460 terminate the radio communications with wireless devices, such as PTC phone 480. BTS's 460 each include a plurality of transceivers (TXR's) 462, a detection system 463, and a Channel Element (CE) pool 464. Transceivers 462 include antennas (not shown) that transmit and receive signals over leased radio frequencies. Transceivers 462 create a "cell" within which cellular phones, PCS phones, or other wireless devices are able to communicate with transceivers 462. CE pool 464 represents a plurality of channel elements in each BTS 460.

BTS's 460 communicate with Radio Control Servers (RCS's) 476, Mobility Manager (MM) 478, and RNC 450 over signaling network 473 to exchange signaling. There is generally one RCS 476 for each BTS 460 in RAN 404. BTS's 460 communicate with RNC 450 over bearer network 474 to exchange bearer traffic.

RNC 450 acts as a switch between BTS's 460 and packet data network 443 to transport packet voice and data. RNC 450 includes a Traffic Control Server (TCS) 452, a Packet Control Function (PCF) 454, and a Frame Selector (FS) pool 456. RNC 450 may also communicate with other BTS's (not shown), other RNC's (not shown), and a Mobile Switching Center (MSC) (not shown). TCS 452 manages resources in RNC 450, such as allocating and de-allocating frame selectors in FS pool 456, and manages call setup and call tear-down. PCF 454 interfaces RNC 450 with packet data network 443 through PDSN server 446. FS pool 456 represents a pool of frame selectors in RNC 450.

Communication network 400 is set up and operates differently than prior networks to handle low latency services. A special connection 435 is pre-established on bearer network 434 to transport call signaling. The special connection 435 may be supported over Frame Relay, ATM, or IP network. Communication network 400 may pre-establish multiple special connections depending on the bandwidth needed and the number of BTS's that are served by RNC 410. Special connection 435 comprises a separate, parallel signaling network in RAN 402.

On special connection 435, a portion of the capacity of special connection 435 is reserved for transporting signaling messages. For instance, assume that special connection 435 comprises a T-1 line. The portion of the capacity of special connection 435 may comprise a fractional of a DS0, or one or more DS0's. In another example, assume that special connection 435 comprises a fiber facility. The portion of the capacity of special connection 435 reserved for transporting call signaling comprises at least a fractional of the bandwidth of the fiber facility.

In establishing special connection 435, BTS 420 and/or RCS 436 designate a special channel element (s-CE) from CE pool 424 to handle call signaling. RNC 410 or TCS 412 in RNC 410 dedicates a small pool of frame selectors 418 from FS pool 416 to handle call signaling from BTS's 420. The special frame selector (s-FS) of the special frame selector pool 418 corresponds to the special channel element (s-CE) in BTS 420. Each BTS 420 connected to RNC 410, directly or indirectly, may establish special connections as described above.

The portion of the capacity of special connection 435 reserved for call signaling is scalable depending on the needs of RAN 402. As the traffic associated with low-latency signaling increases, RNC 410 may adjust the size of special FS pool 418 dedicated to handle call signaling. Assume that RNC 410 includes twenty processors and each processor is able to perform the function of one hundred frame selectors. RNC 410 may dedicate two hundred frame selectors from FS pool 416 to handle call signaling for low latency services, which means that two of the twenty processors may be dedicated to handle call signaling for low latency services. If RAN 402 is handling an increased amount of low latency services, then RNC 410 may dedicate more frame selectors to special FS pool 418 to handle call signaling for low latency services. More processors may be added to RNC 410 if needed. Also, each BTS 420 may dedicate multiple special channel elements (s-CE) to handle call signaling if needed.

Referring to FIG. 4B, a special connection 475 may be set up in RAN 404 in a similar manner.

Assume for this embodiment that PTC phone 440 and PTC phone 480 have registered with PTC server 442 as described above for FIGS. 1A and 1B. A PPP session between PTC phone 440 and PDSN server 441, and a PPP session between PTC phone 480 and PDSN server 446 are dormant. PTC phones 440 and 480 are both 3G phones that provide voice, data, and Push to Call (PTC) services. With both PTC phones 440 and 480 registered with PTC server 442, PTC phone 440 may make a PTC-type call. To initiate the call, the user of PTC phone 440 presses the Push to Call button on PTC phone 440. PTC phone 440 generates a call setup message, such as a PTC request, and transmits the call setup message over radio frequencies. The PTC request may be to one or more recipients.

One of transceivers 422 in BTS 420 receives the call setup message from PTC phone 440. The receiving transceiver 422 forwards the call setup message to detection system 423. Detection system 423 processes the call setup message to determine if the call setup message is for a low latency service. If the call setup message is not for a low latency service, then BTS 420 transfers the PTC message over signaling network 433 in a conventional manner as described in FIGS. 1A and 1B. If the call setup message is for a low latency service, then detection system 423 forwards the call setup message to the special channel element (s-CE) in CE pool 424 dedicated to handle call signaling. The special channel element (s-CE) forwards the call setup message over special connection 435 on bearer network 434 to the special frame selector (s-FS) in special FS pool 418.

The special frame selector (s-FS) then forwards the call setup message to PCF 414. The special frame selector (s-FS) may encode or further process the call setup message. Responsive to receiving the call setup message, PCF 414 looks up a record for PTC phone 440. The record indicates the address for a PDSN used to establish a prior PPP session with PDSN server 441 (referred to as the originating PDSN). PCF 414 forwards the call setup message to PTC server 442 through PDSN server 441. In GSM or UMTS networks, PCF 414 and PDSN server 441 may be a Serving GPRS Service Node (SGSN) and a Gateway GPRS Service Node (GGSN).

Responsive to the call setup message, PTC server 442 determines recipients for the PTC call. PTC server 442 may look up records on the recipients for the call. PTC server 442 may look to "buddy lists" or group lists previously established for PTC phone 440. The recipient in this case is PTC phone 480.

PTC server 442 looks up a record for PTC phone 480. The record indicates the address of a PDSN used to establish the prior PPP session (referred to as the terminating PDSN), an identity of PTC phone 480, etc. Based on the record, PTC server 442 forwards the call setup message to PCF 454 of RNC 450 through PDSN server 446.

In response to receiving the call setup message, RNC 450 determines if the call setup message is for a low latency service. If the call setup message is for a low latency service, then RNC 450 forwards the call setup message to each special frame selector (s-FS) in special FS pool 458. RNC 450 may not know which BTS 460 is servicing PTC phone 480. Therefore, RNC 450 also generates a paging request to have the BTS's 460 "page" the PTC phone 480. RNC 450 forwards the paging request to each special frame selector (s-FS) in special frame selector pool 458, which then forwards the paging request and the call setup message over the special connection 475 on bearer network 474 to the corresponding special channel element (s-CE) in CE pool 464.

Responsive to the paging request received by special channel element (s-CE), each BTS 460 sends a page over a paging channel. If PTC phone 480 receives the page and then subsequently the call setup message, then PTC phone 480 transmits a response message over radio frequencies. One of transceivers 462 in BTS 460 receives the response message from PTC phone 480.

The receiving BTS 460 then forwards the response message to detection system 423. Detection system 423 processes the response message to determine if the response message is for a low latency service. If the response message is not for a low latency service, then BTS 460 transfers the response message over signaling network 473 in a conventional manner as described in FIGS. 1A and 1B. If the response message is for a low latency service, then detection system 423 forwards the response message to the special channel element (s-CE) in CE pool 464 dedicated to handle call signaling. The special channel element (s-CE) forwards the response message over special connection 475 on bearer network 474 to the special frame selector (s-FS) in special FS pool 458.

The special frame selector (s-FS) then forwards the call setup message to PCF 454. PCF 454 forwards the response message to PTC server 442 using the established PPP session between PTC phone 480 and PDSN server 446. PTC server 442 receives the response message and forwards the response message to PCF 414 of RNC 410 using the established PPP session between PTC phone 440 and PDSN server 441.

RNC 410 determines if the response message is for a low latency service. If the response message is for a low latency service, then RNC 410 forwards the response message to the special frame selector (s-FS) in FS pool 418. The special frame selector (s-FS) then forwards the response message over the special connection 435 on bearer network 434 to the special channel element (s-CE) in CE pool 424.

Responsive to receiving the response message, BTS 420 transmits the response message to PTC phone 440 over radio frequencies. PTC phone 440 receives the response message, which indicates that the PTC call is set up.

With the call set up, the user of PTC phone 440 can talk to a user of PTC phone 480. The exchange of packet voice traffic between the phones 440 and 480 takes place over the bearer networks 434 and 474. While special connections 435 and 475 are established and used to transmit call signaling, they are also used (if capacity permits) to transport traditional voice and data bearer traffic, as to maximize transport facility (T1's and E1's) efficiency. A control system, such as RCS 436 and RCS 437, may control the amount of bearer traffic allowed on special connections 435 and 475 to help ensure latency on special connections 435 and 475. Also, a bearer traffic limit minimizes impacts on the quality of voice and data calls carried over special connections 435 and 475.

By establishing special connections 435 and 475 for transporting call signaling, communication network 400 is advantageously able to handle low latency services. Communication network 400 can provide faster call setup, such as one second or less, by using the special connections 435 and 475 to transport call signaling.

Bearer networks 434 and 474 are configured to transport real-time critical communications, such as voice calls. The real-time critical communications are more intolerable to delays and jitter, so bearer networks 434 and 474 are engineered to minimize latency and jitter. Because bearer networks 434 and 474 are focused on low latency, bearer networks 434 and 474 can be used to provide the low latency services.

At the same time, communication network 400 transports the call signaling over signaling networks 433 and 473 if low latency call setup is not needed. Signaling networks 433 and 473 are focused on capacity, and can therefore handle a high volume of calls. By using parallel signaling networks, communication network 400 can advantageously optimize call setup latency without sacrificing capacity.

We claim:

1. A wireless communication network configured to provide low latency services to mobile wireless devices, the wireless communication network comprising:
    a transport network comprising:
        a signaling network configured to transport call signaling; and
        a bearer network configured to transport bearer traffic, wherein a special connection on the bearer network is established and at least a portion of the capacity of the special connection is reserved for transporting call signaling for low latency services;
    a base station system connected to the transport network, the base station system, responsive to receiving call signaling from a mobile wireless device, determines if the call signaling is for a low latency service, forwards the call signaling over the special connection on the bearer network if the call signaling is for a low latency service, and forwards the call signaling over the signaling network if the call signaling is not for a low latency service; and
    a switching system connected to the transport network, the switching system, responsive to receiving the call signaling over the special connection on the bearer network or the signaling network, forwards the call signaling over a packet data network.

2. The wireless communication network of claim 1, wherein:
    the switching system, responsive to receiving call signaling from the packet data network, determines if the call signaling is for a low latency service, forwards the call signaling over the special connection on the bearer network if the call signaling is for a low latency service, and forwards the call signaling over the signaling network if the call signaling is not for a low latency service.

3. The wireless communication network of claim 1 wherein the low latency service comprises a Push to Call service.

4. The wireless communication network of claim 1 wherein the special connection also transports bearer traffic in addition to call signaling.

5. The wireless communication network of claim 4 further comprising:
    a control system that controls the amount of bearer traffic allowed on the special connection to help ensure latency on the special connection.

6. The wireless communication network of claim 1 wherein:
    the special connection comprises a T-1 line; and
    the portion of the capacity of the special connection reserved for transporting call signaling comprises at least a fractional of a DS0; or
    the special connection comprises a fiber facility; and
    the portion of the capacity of the special connection reserved for transporting call signaling comprises at least a fractional of the bandwidth of the fiber facility.

7. A method of operating a wireless communication network configured to provide low latency services to mobile wireless devices, the wireless communication network comprising a transport network, a base station system, and a switching system, the transport network comprising a signaling network configured to transport call signaling and a bearer network configured to transport bearer traffic, the method comprising the steps of:
    establishing a special connection on the bearer network;
    reserving at least a portion of the capacity on the special connection for transporting call signaling for low latency services;
    in response to receiving call signaling in the base station system from a mobile wireless device,
        determining if the call signaling received by the base station system is for a low latency service,
        forwarding the call signaling over the special connection on the bearer network if the call signaling is for a low latency service, and
        forwarding the call signaling over the signaling network if the call signaling is not for a low latency service; and
    in response to receiving the call signaling in the switching system over the special connection or the signaling network, forwarding the call signaling over a packet data network.

8. The method of claim 7, wherein in response to receiving call signaling from the packet data network into the switching system, the method further comprises the steps of:
    determining if the call signaling received by the switching system is for a low latency service, forwarding the call signaling over the special connection on the bearer network if the call signaling is for a low latency service, and forwarding the call signaling over the signaling network if the call signaling is not for a low latency service.

9. The method of claim 7 wherein the low latency service comprises a Push to Call service.

10. The method of claim 7 further comprising the step of:
transporting bearer traffic over the special connection in addition to call signaling.

11. The method of claim 10 further comprising the step of:
controlling the amount of bearer traffic allowed on the special connection to help ensure latency on the special connection.

12. The method of claim 7 wherein the special connection comprises a T-1 line and the portion of the capacity of the special connection reserved for transporting call signaling comprises at least a fractional of a DS0.

13. The method of claim 7 wherein the special connection comprises a fiber facility and the portion of the capacity of the special connection reserved for transporting call signaling comprises at least a fractional of the bandwidth of the fiber facility.

14. A method of operating a wireless communication network configured to provide low latency services to mobile wireless devices, the wireless communication network comprising a transport network, a base station system, and a switching system, the transport network comprising a signaling network configured to transport call signaling and a bearer network configured to transport bearer traffic, the method comprising the steps of:

establishing a special connection on the bearer network;

reserving at least a portion of the capacity on the special connection for transporting call signaling for low latency services;

in response to receiving call signaling in the switching system from a packet data network,
determining if the call signaling received by the switching system is for a low latency service, forwarding the call signaling over the special connection on the bearer network if the call signaling is for a low latency service, and forwarding the call signaling over the signaling network if the call signaling is not for a low latency service; and in response to receiving the call signaling in the base station system over the special connection or the signaling network, forwarding the call signaling to a mobile wireless device.

15. The method of claim 14, wherein in response to receiving call signaling from the mobile wireless device into the base station system, the method further comprises the steps of:

determining if the call signaling received by the base station system is for a low latency service, forwarding the call signaling over the special connection on the bearer network if the call signaling is for a low latency service, and forwarding the call signaling over the signaling network if the call signaling is not for a low latency service.

16. The method of claim 14 wherein the low latency service comprises a Push to Call service.

17. The method of claim 14 further comprising the step of:
transporting bearer traffic over the special connection in addition to call signaling.

18. The method of claim 17 further comprising the step of:
controlling the amount of bearer traffic allowed on the special connection to help ensure latency on the special connection.

19. The method of claim 14 wherein the special connection comprises a T-1 line and the portion of the capacity of the special connection reserved for transporting call signaling comprises at least a fractional of a DS0.

20. The method of claim 14 wherein the special connection comprises a fiber facility and the portion of the capacity of the special connection reserved for transporting call signaling comprises at least a fractional of the bandwidth of the fiber facility.

* * * * *